(12) United States Patent
Kaji et al.

(10) Patent No.: US 7,031,831 B2
(45) Date of Patent: Apr. 18, 2006

(54) VEHICLE NAVIGATION APPARATUS AND PROGRAM

(75) Inventors: Takanori Kaji, Okazaki (JP);
Mitsuhiro Nimura, Okazaki (JP);
Kunihiro Yamada, Okazaki (JP);
Hiroyoshi Masuda, Okazaki (JP)

(73) Assignee: Aisin Aw Co., Ltd., Anjo (JP)

( * ) Notice: Subject to any disclaimer, the term of this patent is extended or adjusted under 35 U.S.C. 154(b) by 28 days.

(21) Appl. No.: 10/473,353

(22) PCT Filed: Nov. 5, 2002

(86) PCT No.: PCT/JP02/11521

§ 371 (c)(1),
(2), (4) Date: Sep. 30, 2003

(87) PCT Pub. No.: WO03/040654

PCT Pub. Date: May 15, 2003

(65) Prior Publication Data

US 2004/0102899 A1 May 27, 2004

(30) Foreign Application Priority Data

Nov. 5, 2002 (JP) ............................. 2001-339168

(51) Int. Cl.
*G01C 21/00* (2006.01)

(52) U.S. Cl. ...................... 701/210; 701/209

(58) Field of Classification Search ................ 701/23, 701/25–26, 200–202, 204, 208–211
See application file for complete search history.

(56) References Cited

U.S. PATENT DOCUMENTS

| 5,787,383 A | * | 7/1998 | Moroto et al. ............... 701/210 |
| 6,049,753 A | * | 4/2000 | Nimura ....................... 701/201 |

FOREIGN PATENT DOCUMENTS

| EP | 0 805 336 A2 | 11/1997 |
| JP | U 57-88300 | 5/1982 |
| JP | A 8-82527 | 3/1996 |
| JP | A 9-89579 | 4/1997 |
| JP | A 10-132593 | 5/1998 |
| JP | A 2000-46575 | 2/2000 |

* cited by examiner

*Primary Examiner*—Yonel Beaulieu
(74) *Attorney, Agent, or Firm*—Oliff & Berridge, PLC (57) ABSTRACT

A vehicle navigation apparatus for searching for a route from an inputted place of departure to an inputted destination and performing guide, the apparatus comprising: a registration unit for associating a traveled route with a place of departure and a destination and thus registering the traveled route; a judgment unit for judging whether the same place of departure and destination as a place of departure and a destination of a registered route are inputted or not; a route search unit for reading out information of the registered route when it is judged by the judgment unit that the same place of departure and destination are inputted, and lowering weighting in searching for the route so as to search for the route; and a control unit for performing guide of the route found by the search by the route search unit. Thus, route guide preferred by a user can be performed.

13 Claims, 8 Drawing Sheets

COMPARISON OF REGISTERED ROUTES

| | REGISTERED ROUTES | |
|---|---|---|
| A | SHORTEST TIME | 53 min. |
| A | AVAILABLE TIME | 1 hour 03 min. |
| B | SHORTEST TIME | 62 min. |
| B | AVAILABLE TIME | 1 hour 04 min. |
| C | SHORTEST TIME | 40 min. |
| C | AVAILABLE TIME | 1 hour 10 min. |

VEHICLE NAVIGATION APPARATUS AND PROGRAM

INCORPORATION BY REFERENCE

The disclosure of Japanese Patent Application No. 2001-339168 filed Nov. 5, 2001, including the specification, drawings, and claims is incorporated herein by reference in its entirety.

BACKGROUND OF THE INVENTION

1. Field of Invention

This invention relates to a vehicle navigation apparatus, and a method for controlling the apparatus.

2. Description of Related Art

In a conventional navigation apparatus, when a place of departure, the current position, and/or a destination are inputted, search data of road data and the like are read out and route search is performed. The route search is typically based on preset search logic for the shortest traveling distance, preference for a particular road type, and so on. As the user selects one of the routes returned by the search, the user is guided by visual signals and/or audio signals along the selected route until the user reaches the destination.

In some cases, however, a route returned by a search based only on search logic and search data as described above may not fit the route that the user prefers. For example, in the case of a route from a place of departure (home) to a destination (workplace), like a commuter route frequently used by the user, the same route from the place, of departure to the destination is always returned by search and as a result, the user often does not use the navigation apparatus. Furthermore, even if the user continues to use the navigation apparatus, the user remembers the route and drives on the route without depending on the navigation apparatus.

Finally, if the user tries to locate a route using the conventional navigation apparatus that the user found on his or her own as a result of his/her own driving, a search based on search logic will not necessarily find that route.

SUMMARY OF THE INVENTION

Therefore, in order to solve the foregoing problems, the invention provides a vehicle navigation apparatus for searching for a route from an inputted place of departure to an inputted destination and performing guidance, the apparatus including a controller that registers a traveled route by associating a traveled route with a place of departure and a destination and judges whether the inputted place of departure and the inputted destination are the same as a respective place of departure and destination of a registered route. If it is judged that a registered route has the same place of departure and same place of destination as the respective inputted pace of departure and inputted destination, the controller searches for a route by reading out information of that registered route and lowering a search weight for the route; and performs guidance based on the route found by the search.

The invention further provides a vehicle navigation apparatus for searching for a route from an inputted place of departure to an inputted destination and performing guidance, the apparatus including a controller that registers a traveled route by associating a traveled route with a place of departure and a destination and judges whether the inputted place of departure and the inputted destination are the same as a respective place of departure and a destination of a registered route. If it is judged that a registered route has the same place of departure and same place of destination as the respective inputted place of departure and inputted destination, the controller searches for a route by reading out information of plural registered routes, and performs guidance based on a selected route.

Additionally the invention provides a method for a route from an inputted place of departure to an inputted destination, including registering a traveled route by associating a traveled route with a place of departure and a destination, judging whether the inputted place of departure and the inputted destination are the same as a respective place of departure and destination of a registered route, if it is judged that a registered route has the same place of departure and same place of destination as the respective inputted pace of departure and inputted destination, searching for a route by reading out information of the registered route, and lowering a search weight for the route, and performing guidance based on the route found by the search.

Finally, the invention provides a method for a route from an inputted place of departure to an inputted destination, including registering a traveled route by associating a traveled route with a place of departure and a destination, judging whether the inputted place of departure and the inputted destination are the same as a respective place of departure and destination of a registered route, and if it is judged that a registered route has the same place of departure and same place of destination as the respective inputted pace of departure and inputted destination, reading out information of plural registered routes, and performing guidance based on a selected route.

BRIEF DESCRIPTION OF THE DRAWINGS

Embodiments of the present invention will now be described with reference to the drawings, wherein.

DETAILED DESCRIPTION OF PREFERRED EMBODIMENTS

Figure 1:
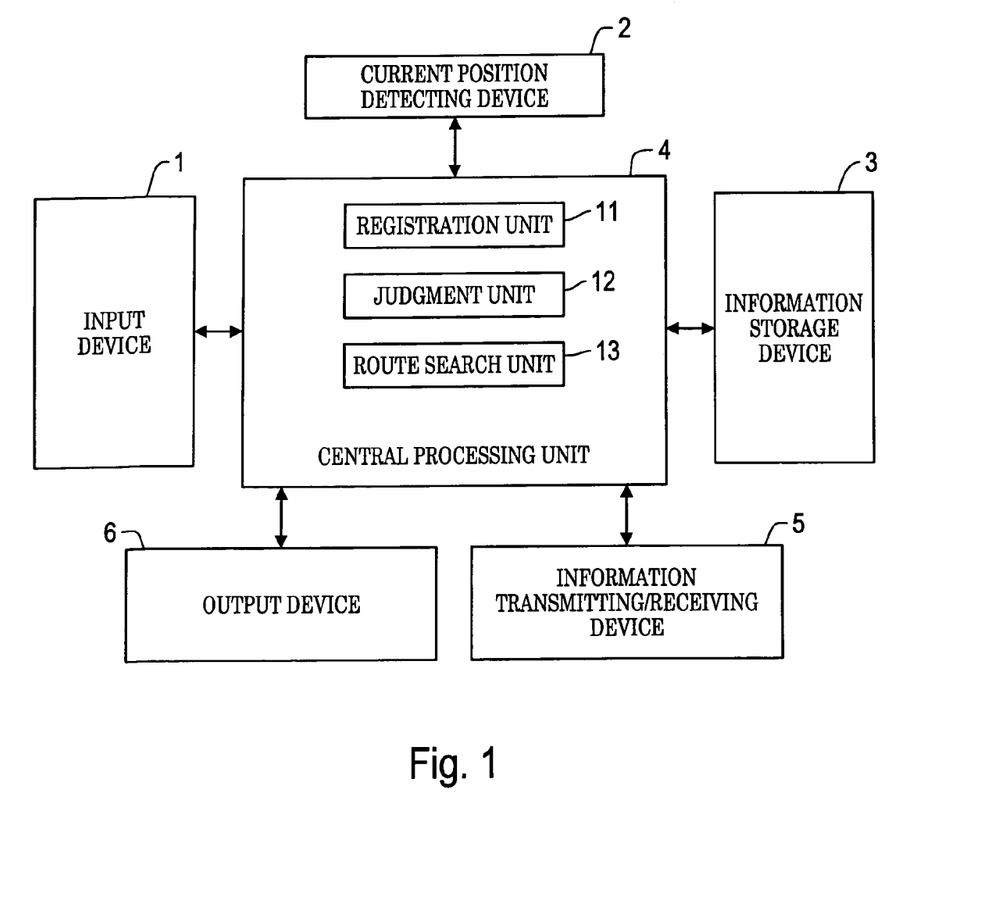
FIG. 1 shows an embodiment of a navigation apparatus according to the present invention.

FIG. 1 shows an embodiment of a navigation apparatus according to the present invention. It includes an input device 1 for inputting information related to route guidance, such as a place of departure and a destination; a current position detecting device 2 for detecting information related to the current position of the vehicle on which the navigation apparatus is loaded; an information storage device 3 in which map data, navigation data necessary for route search, visual/audio guide data necessary for route guide, and programs (applications and/or operating systems) for performing map display, route search and guide such as audio guide are recorded; a central processing unit 4 for performing, navigation processing, map display processing, route search processing; and display/audio guide processing necessary for route guide, as well as for controlling the entire system; an information transmitting and receiving device 5 for transmitting and receiving, for example, road information and traffic information regarding traveling of the vehicle, detecting, transmitting and receiving information related to the current position of the vehicle; and an output device 6 such as a display and a speaker for outputting information related to route guide.

The input device 1 has a function of, at least, selecting a map and inputting a place of departure and a destination, or instructing the central processing unit 4 to perform navigation processing, based on a user's unput. As a measure for realizing the function, for example, a remote controller such as a touch switch or a jog dial can be used which inputs a destination using a telephone number, a coordinate on a map or the like, or requests guidance. The input device also has a device for detecting audio input and functions as an audio input device. A recording card reading device for reading data recorded on an IC card or magnetic card can also be added. Moreover, a data communication device can be added which transmits and receives data to and from an information source such as an information center that stores necessary data for navigation and provides information via a communication line in response to the driver's request on a portable electronic device having data like map data, destination data, a simple map and a building shape map. If a user does not designate a particular place of departure, when searching for a route, the current position of the user's vehicle that is acquired by the current position detecting device 2, is input by the central processing means.

The current position detecting device 2 may include, for example, a unit for acquiring current position information of the vehicle including height information by using the Global Positioning System, an absolute direction sensor for detecting the traveling direction of the vehicle in the form of absolute direction, for example, by using geomagnetism, a relative direction sensor for detecting the traveling direction of the vehicle in the form of relative direction, for example, by using a steering sensor or a gyro sensor, a speed/distance sensor for detecting the traveling speed and the traveling distance of the vehicle, for example, from the number of rotations of the wheels, and/or a sensor for detecting the acceleration of the vehicle and thus detecting current position information including height information.

The information storage device 3 is an external storage device in which programs and data for navigation are stored. It may include, for example, an optical disc such as CD-ROM or DVD-ROM, a flexible disk, a magnetic disk such as a hard disk, or a magneto-optical disc such as MO. The information storage device 3 stores programs, (e.g., a program for performing processing such as route search, a processing program as shown in the flowchart described in this embodiment, a program for performing display output control necessary for route guide, a program for performing route guidance based on audio input and necessary data for this program, and a program for performing audio output control necessary for audio guide) and necessary data for the programs. The stored data includes map data; road data, including traffic control data and the like; place-name data, including the names of administrative districts and the names of regions; search data; data of searched routes; guide data; map matching data; destination data; registered place data; facility data; image data of junctions such as intersections; data by genre; landmark data; and the like. Typically, all the necessary data for operation of the navigation apparatus is stored in the information storage device 3. However, it is also possible to store only a portion of the data in the information storage device 3 and store some or all of the programs in the central processing unit 4.

The central processing unit 4 has a registration unit 11 having a function of associating and registering a place of departure, a destination and a traveled route with each other, and a function of recording travel time between a place of departure and a destination. The central processing unit 4 has a function of updating and registering the shortest traveling time and distance traveled in the past between the same place of departure and destination. The central processing unit 4 further has a judgment unit 12 for determining whether the same place of departure and same destination as the place of departure and destination according to a previously registered route are inputted, and a route search unit 13 for reading out information of the previously registered route when it is determined that the same place of departure and destination are inputted, and searching for the route or routes with the lowest rates Still further, the central processing unit 4 includes a processor for executing various arithmetic processing, a flash memory for reading and storing the programs from the information storage device 3, a ROM in which a program (program reading means) for performing program check and update processing of the flash memory is stored, and a RAM for temporarily storing searched route guidance information such as the point coordinate and road name code number of a preset destination, and data that is being arithmetically processed.

The data registered by the registration unit may also be held in either a non-volatile internal memory or the information storage device 3. When registering information while associating a place of departure, a destination and a traveled route with each other, the information may be saved in a removable storage medium such as a flexible disk or a memory card, and in this case, other users can also use this information. Moreover, there is also provided a frame memory for storing data to be displayed on an output device, such as a display; an audio processor for performing conversational processing based on audio input from the input device 1 and for synthesizing a voice, a phrase, a collective sentence, a sound, or the like, read out from the information storage device 3, converting the synthesized voice or the like to an analog signal, and outputting the analog signal to the speaker on the basis of an audio output control signal from the CPU; a communication interface for transmitting and receiving input/output data through communication; a sensor input interface for taking in a sensor signal from the current position detecting device 2; a clock for entering the date and time into internal diagnostic information; and so on. The above-described program for performing update processing may be stored in the external storage device.

All of the programs according to this embodiment and other programs for executing navigation may be stored in the external storage device, or a part or all of the programs may be stored in the ROM in the main unit. As the data and programs stored in this external storage device are input as external signals to the central processing unit of the navigation apparatus and then arithmetically processed, various navigation functions are realized.

Alternatively, a part or all of the programs according to this embodiment, other programs for executing navigation, and map data may be transmitted from an information center (e.g., an Internet server or server for navigation) to plural base stations (e.g., communication stations connected with an Internet provider terminal and the vehicle through communication). Then, the central processing unit 4 on the terminal side may receive the information sent from the base stations by using the information transmitting/receiving device and download the information into the readable/writable memory (e.g., the RAM, the flash memory, or the hard disk) in the central processing unit 4 so as to execute the programs, thus realizing various navigation functions. It is possible to store the programs and the map data into separate readable/writable memories, e.g., store the programs in the flash memory and store the map data in the RAM, or to store the programs and the map data into the same readable/writable memory. Alternatively, a part or all of the programs and map data may be downloaded to a removable storage medium (e.g., a memory card or a flexible disk) from the information center by using a home personal computer, and the storage medium may be connected with the central processing unit 4 to execute the programs in the storage medium, thus realizing various navigation functions.

The navigation apparatus of this embodiment includes a relatively large-capacity flash memory for reading the programs from the external storage device and reading the programs downloaded from the information center, and a small-capacity ROM in which a program or program reading means for performing CD start-up processing is stored. The flash memory is a non-volatile storage unit that holds the stored information even when the power is disconnected. As the CD start-up processing is started, the program in the ROM as the program reading means is also started so as to check the programs stored in the flash memory, and disc management information and the like, stored in the information storage device 3, is read. Based on this information and the state of the flash memory, the program loading processing (update processing) is performed.

The information transmitting/receiving device 5 includes a GPS receiving device for acquiring information utilizing the Global Positioning System (GPS), a VICS (Vehicle Information and Communication System) receiving device for acquiring information utilizing FM multiplex broadcast, radio beacon, optical beacon and the like, and a data transmitting/receiving device for bidirectionally communicating information with the information center and other vehicles by using a portable telephone, a personal computer and the like.

The output device 6 has a function of outputting guide information audibly and/or visually when the driver needs the information, and a function of printing data processed for navigation by the central processing unit 4. As a measure for realizing these functions, the output device 6 has a memory for spreading and plotting the data processed by the central processing unit 4 and the data stored in the information storage device 3 so as to display the data visually, a display for displaying image data plotted in the memory, a printer for printing the data processed by the central processing unit 4 and the data stored in the information storage device 3, a speaker for outputting route guide by sound, and so on.

The display is formed by a simple liquid crystal display or the like, and displays a spread and plotted enlarged view of an intersection, the name of destination, time, distance, an arrow indicating the traveling direction and so on, on the basis of map display data and guide data processed by the central processing unit 4. The image data displayed on the display is, for example, binary image data (bit map data). The map display data and guide data processed by the central processing unit 4 are received by using a communication line used for serial communication or the like or by sharing another communication line. After the received data is spread and plotted in the memory of the output device 6, a designated display range is displayed on the screen of the display.

This display may be provided in an instrument panel near the driver's seat. By watching this display, the driver can confirm the current position of his/her vehicle or can acquire information about the route that the driver is going to travel. Moreover, a heads-up display may be provided so that the driver can see a guide picture on this display through a half-mirror embedded in the windshield of the vehicle, without looking down. A tablet including a touch panel or a touch screen may be used for the display screen of the display so that the user can input a point or a road by touching the screen or tracing on the screen.

An embodiment of associating and registering a place of departure, a destination and a traveled route with each other will now be described with reference to FIGS. 2A and 2B and FIGS. 3A and 3B.

Figure 2A:
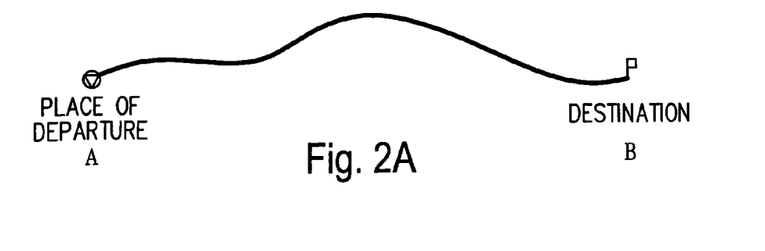
FIGS. 2A and 2B are explanatory views of first registration of a traveled route.
Figure 2B:
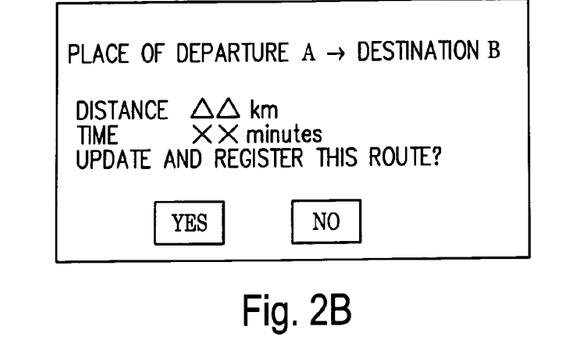

FIGS. 2A and 2B are exemplary views of registration of the first traveled route. FIG. 2A shows route guidance from a place of departure to a destination. FIG. 2B shows a route registration picture on arrival at the destination.

For example, when the vehicle travels a route (shown in FIG. 2A) that is often used by the user such as a commuter route connecting a place of departure A (home) and a destination B (workplace), the distance between the place of departure A and the destination B and the required time for the travel are recorded. For example, when the vehicle starts traveling, the recording of the traveling time is started, and when the vehicle approaches the destination, i.e., is within a predetermined distance, it is judged that the vehicle has reached the destination and the recording of the traveling time is ended. As a method for judging that the vehicle has reached the destination, a condition such as reduction in speed of the vehicle near the destination may be added to the above-described predetermined distance. Thus, whether the vehicle has reached the destination can be determined more accurately. When the destination is reached, the guide picture shifts to a registration picture as shown in FIG. 2B. In this picture, the place of departure, the destination, the traveling distance and the traveling time are displayed. Furthermore, a message "Update and register this route?" and selection items "Yes" and "No" are displayed. If "Yes" is selected, the place of departure, the destination and the traveled route are associated with each other and registered. If "No" is selected, the place of departure, the destination and the traveled route are not registered. When the first route between a specific place of departure and destination is registered, the traveling time and the traveling distance on that route are registered, as well.

If the engine of the vehicle is turned off or if the vehicle stops at the same place or for a predetermined period of time or more, it is possible to disregard the time during which the vehicle is stopped. As a result, accurate timing can be carried out even if the vehicle stops during the route. In the case the vehicle travels setting plural destinations, it is possible to register the traveled route in each section.

Figure 3A:
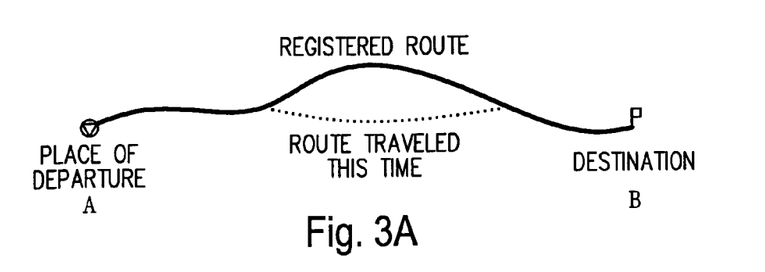
FIGS. 3A and 3B are explanation views of registration of a route in the case the same place of departure and destination as those of a registered route are set.
Figure 3B:
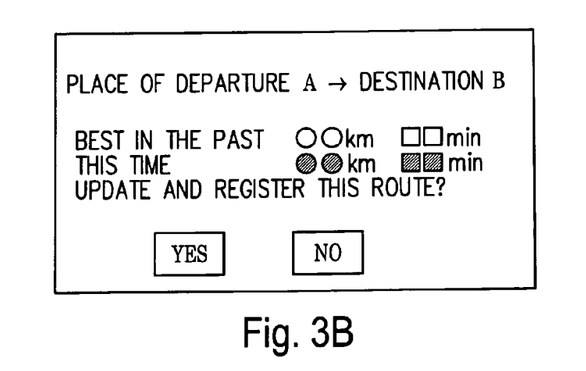

FIGS. 3A and 3B are explanatory views of registration of a route where the same place of departure and same destination as those of a previously registered route are set. FIG. 3A shows a guide route from a place of departure to a destination. FIG. 3B shows a route registration picture on arrival at the destination.

When the same place of departure and same destination as those of a previously registered route are set, the registered route control program starts and the registered route is searched by search with the highest priority. Specifically, in normal route search, for example, priority is given in the order of recommended roads, toll roads, general roads, roads of the shortest distance, and detours. When a route is found by the search and selected by the user, it is used for guide. However, when the same place of departure and destination as those of a previously registered route are set, weighting (search cost) for the registered route is lowered so that the registered route is found with the highest priority. Therefore, a route that meets the user's preference is proposed. Alternatively, the registered route may be proposed as a recommended route without manipulating the search cost. In this case, for example, some roads have traffic control depending on the time slot, and therefore only the parts of the route overlapping the closed roads are changed using traffic control data of road data. As such control is performed, the processing for search is reduced and therefore the time required for route search processing can be reduced.

If the user does not designate a particular place of departure when searching for a route, the current position of the user's vehicle is regarded as the place of departure and search for a route to a destination is performed. However, for example, if a route starting at the parking space of the company as a place of departure has been registered, there arises a problem that the regarded place of departure, slightly away from the registered place of departure, even though it is within the parking space of the company, cannot be recognized as the place of departure (the company). Therefore, judgment on whether or not the place of departure is the same depends on whether or not a current place of departure is within a predetermined distance (for example, within 50 m or 100 m) from a registered place of departure. Thus, even if the current place of departure is slightly away from a registered place of departure, the registered route corresponding to the registered place can be used. As for the destination, when a point of destination is decided by using a facility name or the like, coincidence may be judged with pinpoint accuracy. Alternatively, if a point of destination is decided by input on a map, whether the point is within a predetermined distance from the registered destination may be determined, as in the judgment of the place of departure.

When guidance is performed on the registered route (route indicated by a solid line in FIG. 3A), if the vehicle travels off the registered route on its way as indicated by a dotted line in FIG. 3A. When the vehicle reaches the destination, a selection request is displayed as to whether the place of departure, the destination, the best (shortest) travel distance and travel time in the past, the travel distance and traveling time of the route that is traveled this time, and the traveled route should be registered or not, as shown in the guide picture of FIG. 3B. Because the best or shortest record of travel time is displayed, the user is provided with a criterion for judging whether to update and register the route using the route that is traveled this time. Therefore, because the route to be updated and registered is based on the user's preferred characteristics, the route that meets the user's preference will be provided in the future.

When the vehicle goes off the registered route, as described above, a new search is performed and a route that leads back to the original route is provided. Because the new search is performed in such a manner as to bring the vehicle back to the original route if possible, the user still can use the registered route even if he or she inadvertently goes off the route. Furthermore, if a road that the vehicle traveled on when it departs the guided route is a road that is not usually used for a search, for example, an alley, that road cannot be searched for but it can be registered as part of a new route. In this case, a locus or the like may be displayed on the alley of the registered road so that the user can identify the alley. Thus, the registered route can be used even if a road that cannot be searched for is registered.

A processing flow related to route registration will now be described.

Figure 4:
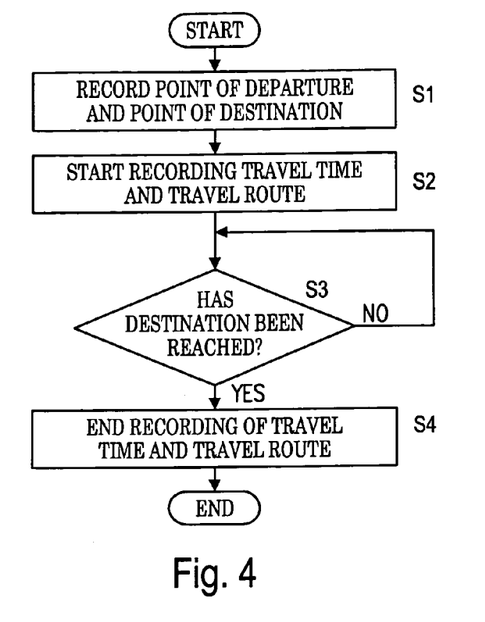
FIG. 4 illustrates a traveling route recording processing flow.

FIG. 4 illustrates a traveling route recording processing flow. First, inputted points of departure and destination are recorded, and the recording of the travel time and recording of the travel route are started (steps S1 and S2). Then it is determined whether the destination has been reached (step S3). When the destination is reached, the recording of the required time and the recording of the travel route end (step S4). As a result, travel time and the travel route (including the traveling distance) from the place of departure to the destination are recorded.

Figure 5:
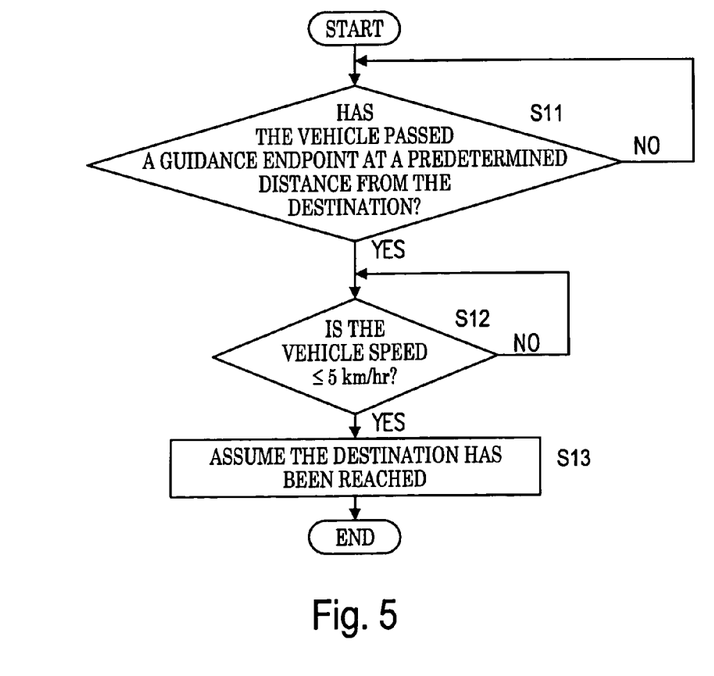
FIG. 5 shows a processing flow that determines whether a destination has been reached.

FIG. 5 shows a processing flow that determines whether a destination has been reached or not. First, it is determined whether the vehicle has passed a guide end point that is at a predetermined distance from the destination (step S11). Once the vehicle passes the guidance end point, it is determined whether the speed of the vehicle is less than or equal to 5 km/h (step S12). If the speed of the vehicle is less than or equal to 5 km/h, it is assumed that the destination has been reached (step S13).

Figure 6:
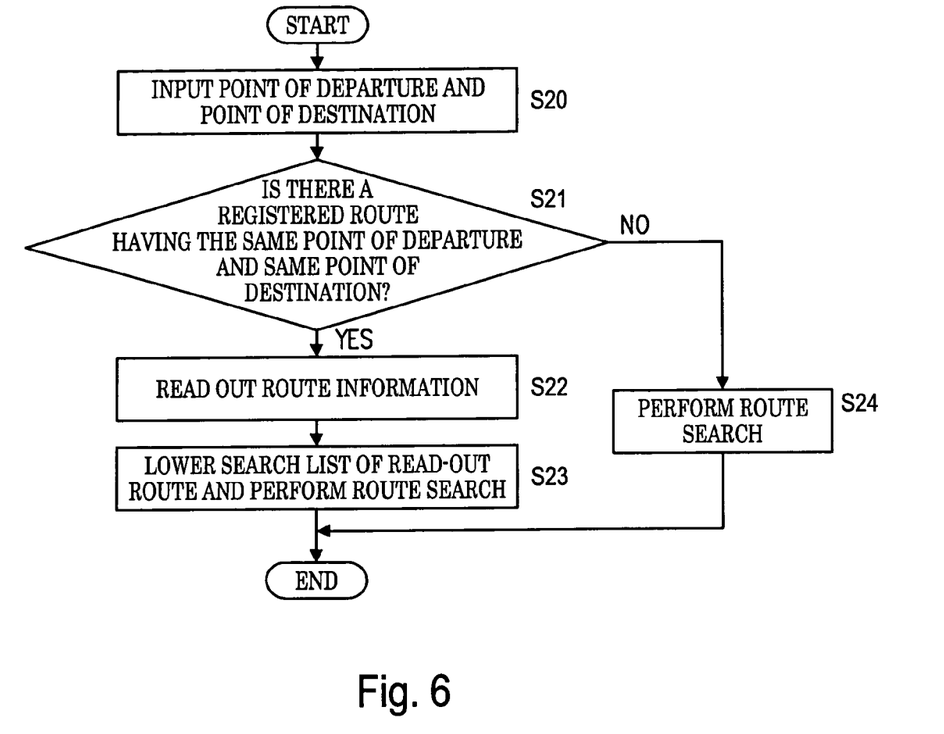
FIG. 6 illustrates a search processing flow for a registered route.

FIG. 6 illustrates a search processing flow for a registered route. A point of departure and a point of destination are inputted (step S21), it is determined whether there is a registered route having the same points of departure and destination as the inputted points of departure and destination (step S22). If there is such a registered route, the route information of that matching route is read out. The search cost of the read-out route is lowered and route search is thus performed. In this manner, the registered route is preferentially searched. If there is no registered route at step S22, a normal route search is performed.

Figure 7:
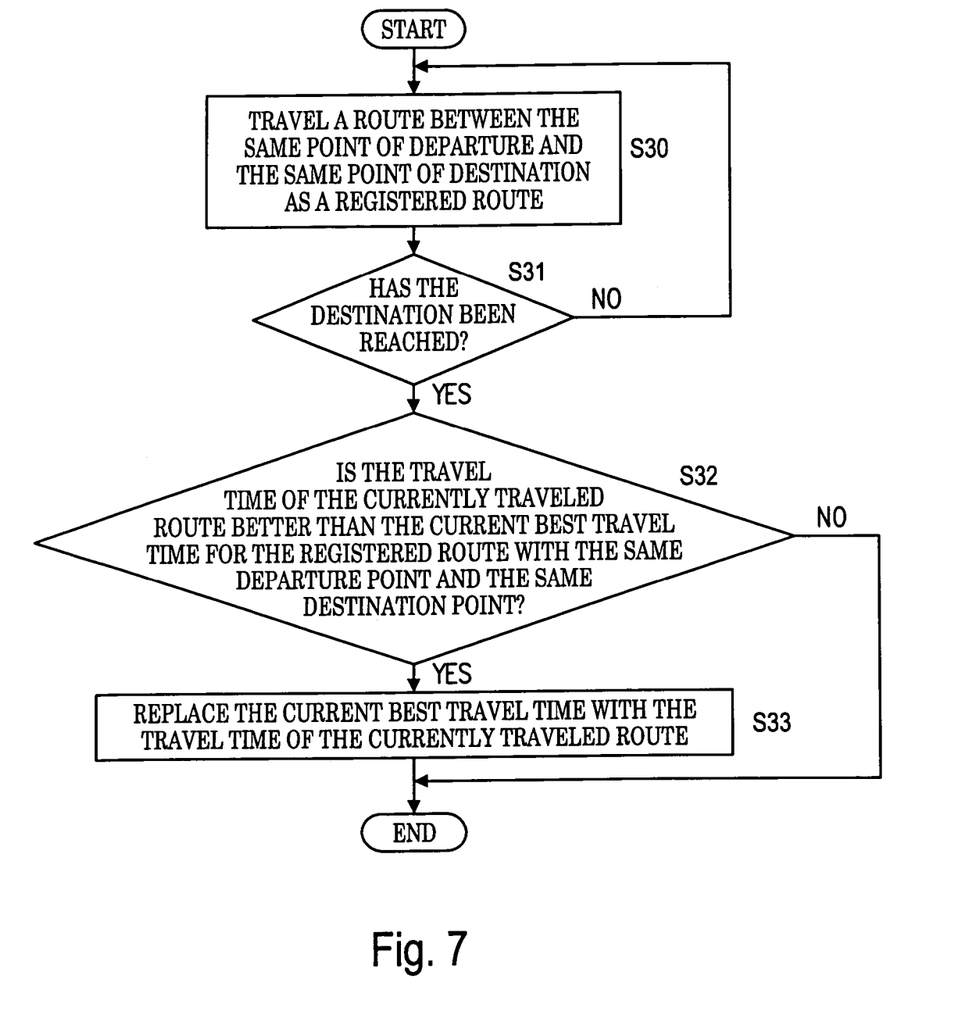
FIG. 7 illustrates a processing flow for updating the shortest travel time.

FIG. 7 illustrates a processing flow for updating the shortest travel time. When the vehicle travels a route between the same point of departure and same point of destination as those of a registered route (step S31) and reaches the destination (step S32), it is determined whether the travel time of the currently marked route (i.e., just traveling to one destination) is better (shorter) than the current best travel time for the registered route with the same departing point and the same destination point (step S33). If it is the best time, the traveling time that is registered and held and the required time in that case are updated (step S34). This processing also applied to the case of a route including an alley.

Figure 8:
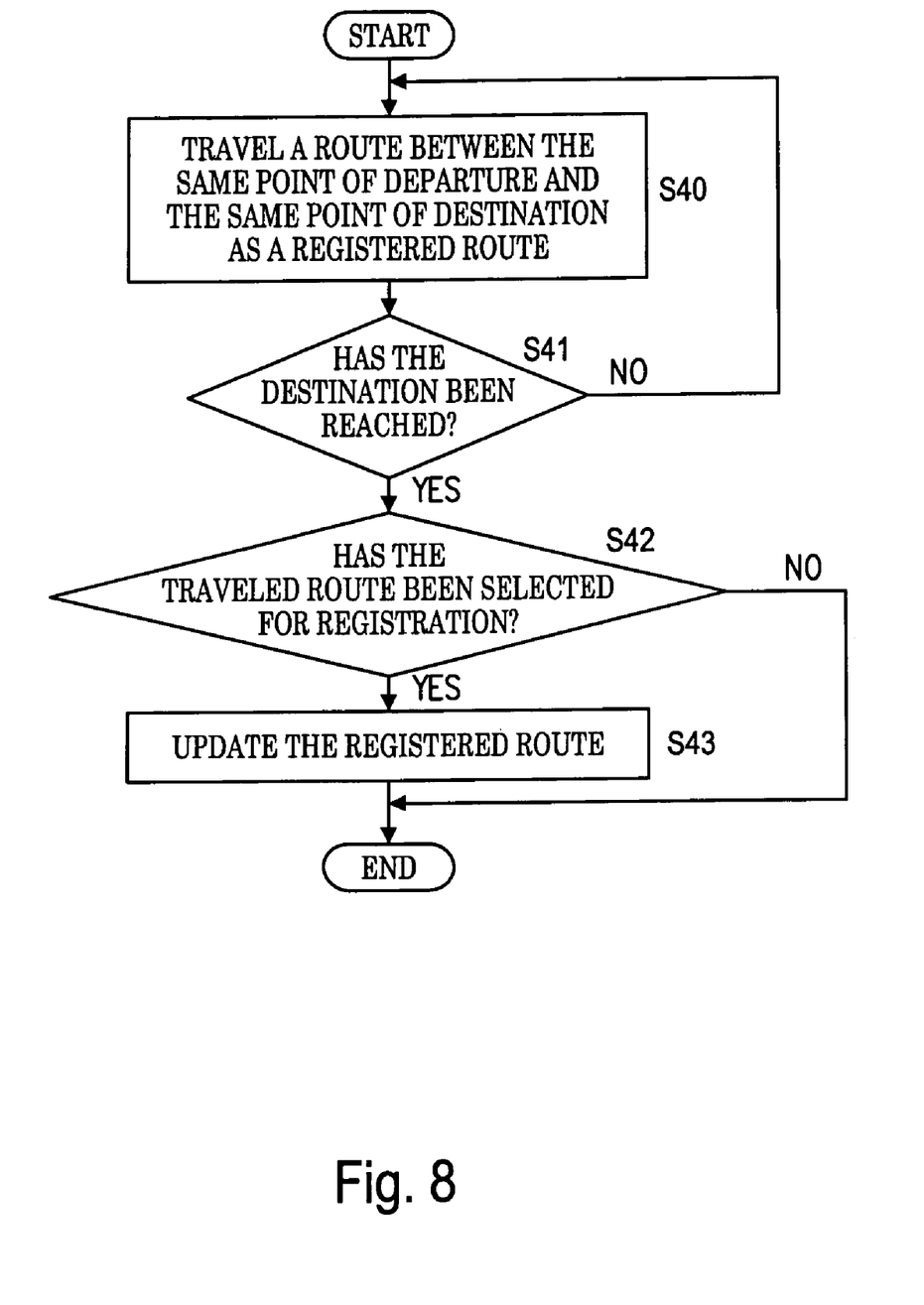
FIG. 8 illustrates an update processing flow for a registered route.

FIG. 8 illustrates an update processing flow for a registered route. When the vehicle travels a route between the same points of departure and destination as those of a registered route (step S41) and reaches the destination (step S42), the user is requested to select whether or not to register the traveled route (step S43). If the user selects registration, the registered route is updated, i.e., the selected route replaces the previously designated route having the same departure point and the same destination point (step S44).

Figure 9:
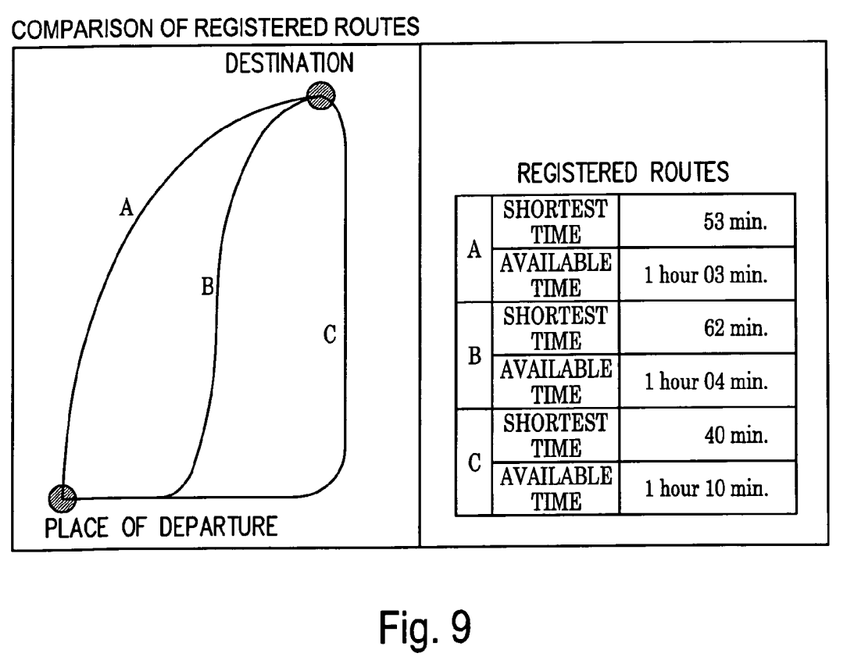
FIG. 9 illustrates an embodiment of associating and registering a place of departure, a destination and plural traveled routes with each other.

Next, an embodiment of associating and registering a place of departure, a destination and plural traveled routes with each other will be described. FIG. 9 is an exemplary embodiment that associates and registers a place of departure, a destination and plural traveled routes with each other. The view shows registered plural routes and time information of the registered routes. Routes A, B and C are routes registered by the registration unit 11 of FIG. 1 and have the same place of departure and the same destination. The routes can be registered by a method similar to the method described with reference to FIGS. 2A and 2B. During registration by the registration unit, the shortest travel time and the average travel time of each route are registered as route information, as shown in FIG. 9. If the route was traveled twice or more, the shortest time of the respective traveling times is registered. If the route was traveled only once, that travel time is registered. Furthermore, if the route was traveled twice or more, the average of the respective traveling times is registered. If the route was traveled only once, that travel time is registered as the average travel time. While only the shortest travel time and the average travel time are registered in this example, the longest time, the traveling distance and the like may also be registered.

When the same place of departure and same destination as those of the registered route are set, route information such as the route and the required time is outputted by a method such as the display, as shown in FIG. 9. From the outputted route information, the user can compare the individual routes and select a route that meets his or her purpose. When one of the registered routes is selected, guidance is performed along the selected route. As the three routes A, B and C are compared in the example shown in FIG. 9, both the shortest travel time and the average travel time of route A are shorter than those of route B and therefore it can easily be determined that route A has a shorter travel time. As for the route C, the shortest travel time is shorter than those of the other two routes but the average travel time is longer. Since there is a large difference between the shortest time and the average time, it can be determined that the route C tends to be congested. By thus comparing the information of the routes, the user can select a route. Furthermore, if the longest travel time, the travel distance and the like are registered, as well, this information can be outputted and compared, such that the user can select a route more accurately.

Figure 10A:
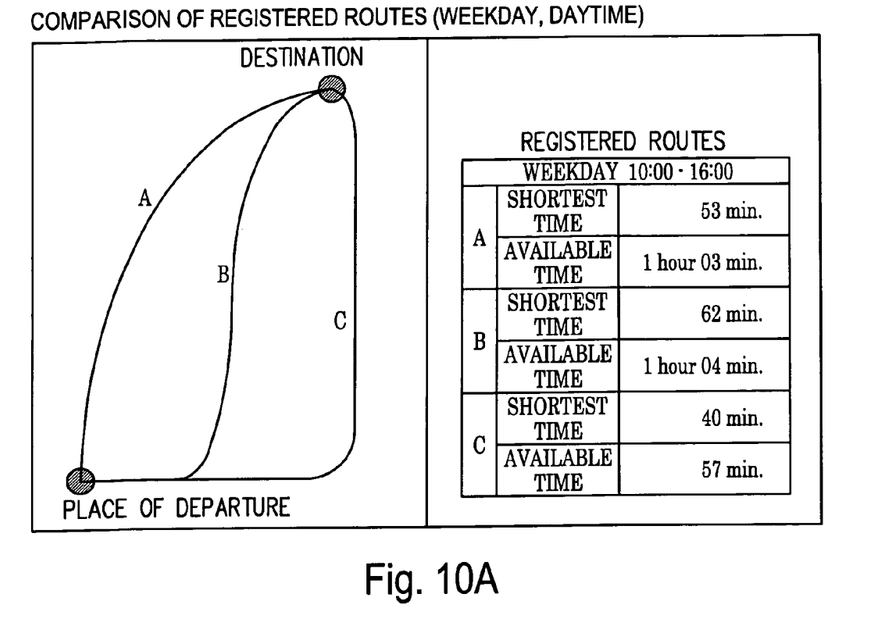
FIGS. 10A and 10B show examples of additionally storing calendar information and traveling time slot information as information of plural routes to be registered.
Figure 10B:
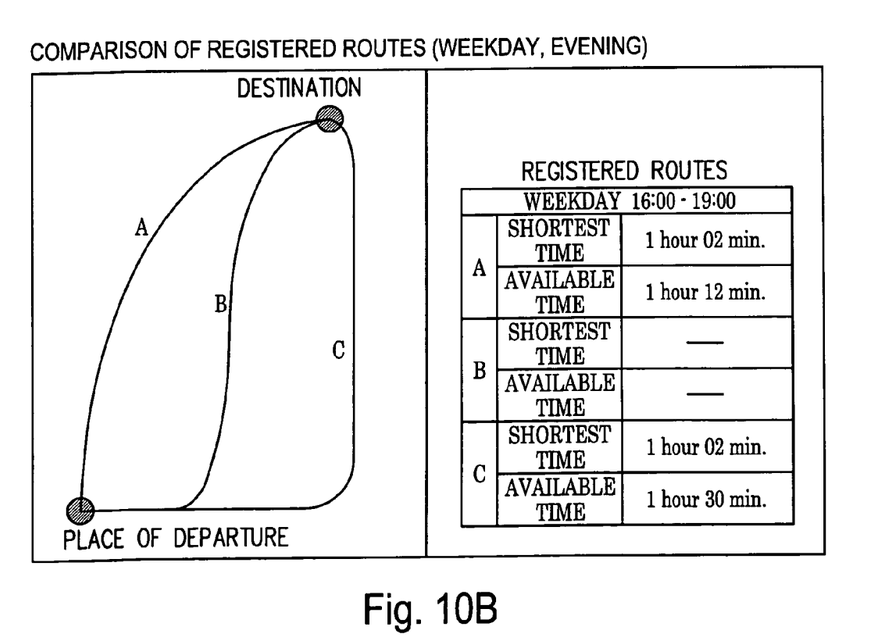

FIGS. 10A and 10B show exemplary embodiments that additionally store calendar information and travel time slot information for plural routes to be registered, when compared to the embodiment of FIG. 9. FIG. 10A shows registered route information in the case of weekday-daytime travel. FIG. 10B shows route information in the case of weekday-evening travel.

Routes A, B and C are routes registered by the registration unit 11 of FIG. 1 and have the same place of departure and the same destination. In the registration by the registration unit 11 in this example, similar to FIG. 9, the shortest time and the average time are registered as route information. Moreover, calendar information (weekday/holiday information), travel time slot and the like are registered. As the travel time slot, the departure time and the arrival time, early morning, daytime, evening, night, late night, or morning and afternoon may be used. Also in this exemplary embodiment, the longest travel time, the travel distance and the like may be registered in addition to the shortest travel time and the average travel time.

When the same place of departure and the same destination as those of the registered route are set, route information such as calendar information, travel time slot and travel time as well as the route is outputted by a method such as display, as shown in FIGS. 10A and 10B. Thus, suitable output methods may be employed, for example, displaying the picture of FIG. 10A and indicating that there is a continuing picture, or displaying the pictures of FIG. 10A and FIG. 10B in one picture. Of course, it is possible to display only one of the calendar information and the travel time slot. Based on the outputted route information, the user may compare the individual routes and selects a route that meets his or her purpose. Then, guidance is performed along the selected route. In the example shown in FIGS. 10A and 10B, in the weekday-daytime (10:00–16:00) route travel (shown in FIG. 10A), both the shortest travel time and the average travel time of route C are shorter than those of route A. Therefore, it can be determined that the route C has a shorter travel time. However, in the weekday-evening travel (16:00–19:00) (shown in FIG. 10B), route C is congested and the average travel time of route A is shorter than that of route C. In FIG. 10B, it is indicated that route B has never been traveled in the evening. Thus, by comparing the information of the individual routes in consideration of the travel time slot, the user can select a route more accurately. If the longest travel time, the travel distance and the like are registered, as well, this information can be outputted and compared, such that the user can select a route that meets the user's preference better.

What is claimed is:

1. A vehicle navigation apparatus for searching for a route from an inputted place of departure to an inputted destination and performing guidance, the apparatus comprising:
a controller that:
registers a traveled route by associating a traveled route with a place of departure and a destination;
judges whether the inputted place of departure and the inputted destination are the same as a respective place of departure and destination of a registered route;
searches, if it is judged that a registered route has the same place of departure and same place of destination as the respective inputted place of departure and inputted destination, for a route by reading out information of the registered route with the same place of departure and same place of destination as the respective inputted place of departure and inputted destination and lowering a search weight for the registered route with the same place of departure and same place of destination as the respective inputted place of departure and inputted destination; and
performs guidance based on a route found by the search.

2. The vehicle navigation apparatus as claimed in claim 1, further comprising a current position detector and a vehicle speed detector,
wherein if it is judged that a destination has been reached from information detected by the current position detector and/or the vehicle speed detector, the controller determines whether to update a currently registered route with a traveled route, and if the controller has determined to update the route, the controller updates and registers the route.

3. The vehicle navigation apparatus as claimed in claim 1, wherein the controller updates and registers the shortest recorded travel time for each registered route between the same place of departure and the same destination.

4. The vehicle navigation apparatus as claimed in claim 1, wherein if the vehicle travels off a guide route, the controller performs a search for a route that would return the vehicle to the guide route.

5. A method for searching for a route from an inputted place of departure to an inputted destination, comprising:
   registering a traveled route by associating a traveled route with a place of departure and a destination;
   judging whether the inputted place of departure and the inputted destination are the same as a respective place of departure and destination of a registered route;
   searching, if it is judged that a registered route has the same place of departure and same place of destination as the respective inputted place of departure and inputted destination, for a route by reading out information of the registered route with the same place of departure and same place of destination as the respective inputted place of departure and inputted destination, and lowering a search weight for the registered route with the same place of departure and same place of destination as the respective inputted place of departure and inputted destination; and
   performing guidance based on a route found by the search.

6. The vehicle navigation apparatus as claimed in claim 1, wherein the controller records the travel time between the place of departure and the destination of the traveled route and interrupts timing while the engine of the vehicle is stopped.

7. The vehicle navigation apparatus as claimed in claim 1, wherein the controller records the travel time between the place of departure and the destination of the traveled route and interrupts timing while the engine of the vehicle is stopped.

8. The vehicle navigation apparatus as claimed in claim 1, wherein the controller records the travel time between the place of departure and the destination of the traveled route and interrupts timing after a predetermined amount of time that the vehicle has stopped.

9. The vehicle navigation apparatus as claimed in claim 8, wherein the controller subtracts the predetermined amount of time from the recorded travel time.

10. The vehicle navigation apparatus as claimed in claim 1, wherein the controller records the travel time between the place of departure and the destination of the traveled route and interrupts timing after a predetermined amount of time that the vehicle has stopped.

11. The vehicle navigation apparatus as claimed in claim 10, wherein the controller subtracts the predetermined amount of time from the recorded travel time.

12. The method of claim 5, wherein the method steps are embodied within a program stored in a memory.

13. A vehicle navigation apparatus for searching for a route from an inputted place of departure to an inputted destination and performing guidance, the apparatus comprising:
   a registration means for registering a traveled route by associating a traveled route with a place of departure and a destination;
   a judgment means for judging whether the inputted place of departure and the inputted destination are the same as a respective place of departure and destination of a registered route;
   a search means for, if it is judged that a registered route has the same place of departure and same place of destination as the respective inputted place of departure and inputted destination, searching for a route by reading out information of the registered route with the same place of departure and same place of destination as the respective inputted place of departure and inputted destination and lowering a search weight for the registered route with the same place of departure and same place of destination as the respective inputted place of departure and inputted destination; and
   a guidance means for performing guidance based on a route found by the search.

* * * * *

UNITED STATES PATENT AND TRADEMARK OFFICE
CERTIFICATE OF CORRECTION

PATENT NO. : 7,031,831 B2 Page 1 of 1
APPLICATION NO. : 10/473353
DATED : April 18, 2006
INVENTOR(S) : Takanori Kaji et al.

It is certified that error appears in the above-identified patent and that said Letters Patent is hereby corrected as shown below:

Title Page
INID (54) Cover,
    Title, replace "VEHICLE NAVIGATION APPARATUS AND PROGRAM" with --VEHICLE NAVIGATION APPARATUS AND METHOD--.

INID (75) Cover,
    Inventors, add --Noboru Ishibashi, Okazaki (JP)--.

INID (30) Cover,
    Foreign Application Priority Date, replace "November 5, 2002 (JP)....................2001-339168" with --November 5, 2001 (JP)..............................2001-339168--.

Signed and Sealed this

First Day of August, 2006

JON W. DUDAS
*Director of the United States Patent and Trademark Office*